Feb. 7, 1939.  W. R. MOSS ET AL  2,145,887
EDGE MOLDING PROCESS
Filed Oct. 6, 1934
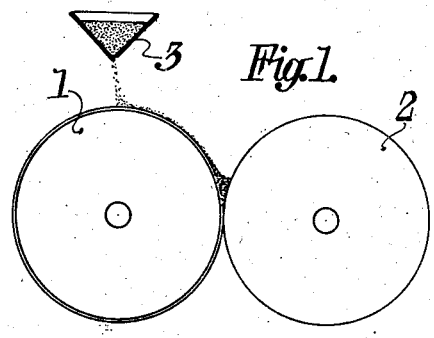
Fig.1.
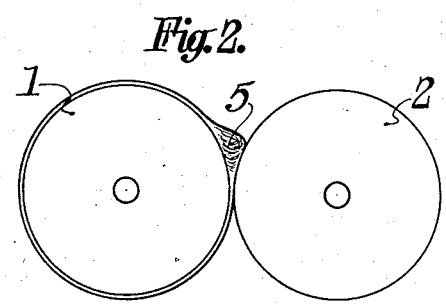
Fig.2.
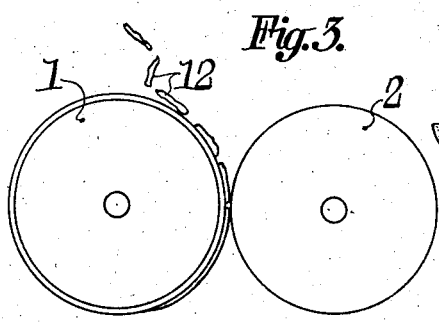
Fig.3.
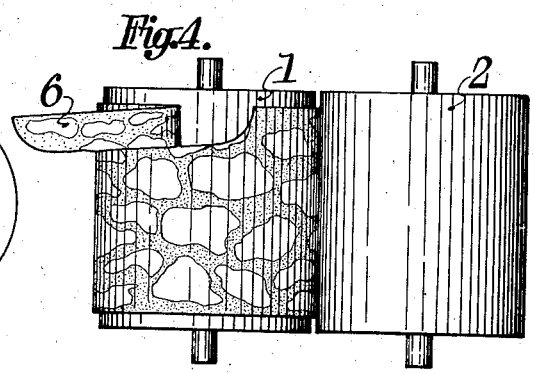
Fig.4.
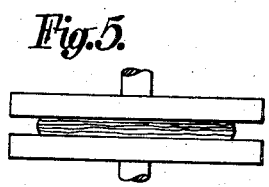
Fig.5.
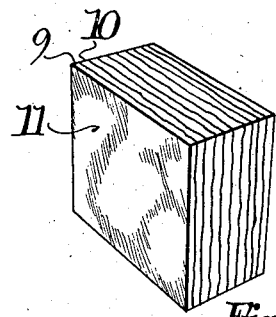
Fig.6.
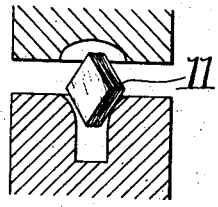
Fig.7.
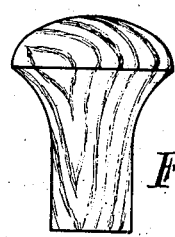
Fig.8.
Fig.9.
Inventors:
Spencer E. Palmer &
William R. Moss,
By Chester M. Perino
Daniel J. Mayne
Attorneys Patented Feb. 7, 1939

2,145,887

UNITED STATES PATENT OFFICE 2,145,887

EDGE MOLDING PROCESS

William R. Moss and Spencer E. Palmer, Kingsport, Tenn., assignors, by mesne assignments, to Eastman Kodak Company, Jersey City, N. J., a corporation of New Jersey Application October 6, 1934, Serial No. 747,195

3 Claims. (Cl. 18—61)

This invention relates to a method of making cellulose derivative molded articles of variegated appearance, and more particularly to a method in which a cellulose derivative mass of striated cross section is subjected to an edge molding operation.

Cellulose derivative plastics have been molded in many different ways and an almost infinite variety of variegated effects have been produced by the use of pigments and coloring materials, such as dyes, pearl essence and other nacreous agents. However, so far as we are aware, methods thus far available to the worker in cellulose derivative plastics have never been capable of producing the particular marble-like effects which are attained by the process to be described herein.

The principal object of the present invention is to provide a method whereby cellulose derivative products having the general appearance of marble or the like may be produced. Another object is to provide a novel means of producing these effects in an extremely simple and efficient manner. A further object is to provide a new process of obtaining decorative effects in cellulose derivative molded products by a process which we shall term herein "edge molding." A still further object is to produce a variegated decorative molded plastic product comprising a substantially transparent or translucent cellulose organic derivative base containing colored or pigmented layers distributed in the base in substantial parallelism but having irregularly spread portions giving an effect somewhat simulating marble or the like. Other objects will appear hereinafter.

These objects are accomplished by the following invention which, in its broadest aspects, comprises the formation of a, preferably, but not necessarily, transparent mass of cellulose derivative material, the distribution in said mass of a plurality of layers of colored or pigmented material of different appearance than the material of the mass and in such manner that when the product is cut into blocks or other shapes suitable for molding it has a striated cross-section. Blocks or other portions of the striated material are then placed in a mold, pressure is applied at the edges of the blocks or portions in a direction which is substantially parallel to the planes of the respective layers contained within the material, with the result that while the dyed or colored or striated layers are somewhat spread within the mass, they are nevertheless maintained substantially in their original parallel relation one to another.

In the following example and description, we have set forth one of the preferred embodiments of our invention which is included merely for purposes of illustration and not as a limitation thereof. Our invention will be further illustrated in connection with the accompanying drawing in which, Figure 1 is a diagrammatic elevational view illustrating one form of apparatus which may be employed in the preliminary steps of our process and the manner in which cellulose derivative material is brought into a sheet suitable for further treatment in accordance with the invention.

Figures 2 and 3 are also diagrammatic elevational views illustrating various steps in the working of the material on a conventional type of plastic working machinery.

Figure 4 is a plan view of the same type of apparatus disclosed in Figures 1–3 and illustrating the method of stripping and overlapping the plastic material on the rolls during the formation of layers therein.

Figure 5 is a diagrammatic illustration of the way in which the plastic material is subjected to platen pressing prior to the formation of the cut portions or cubes.

Figure 6 is a perspective view of a cube or portion of a plastic material after cutting and illustrating the striated cross section thereof.

Figures 7 and 8 are section elevational views of a conventional type of mold illustrating the manner in which the edge molding operation is carried out.

Figure 9 is an elevational view on a slightly enlarged scale of a molded product produced as shown in Figures 7 and 8 in accordance with the invention.

We will now describe our invention by reference to a cellulose acetate plastic, but it will of course be understood that we are not limited to the use of this particular material as our invention is equally applicable to the production of plastic products of variegated appearance from other cellulose derivatives such as cellulose propionate, cellulose butyrate, cellulose acetate propionate, cellulose acetate butyrate, and, in fact, to almost any type of thermoplastic cellulose organic derivative moldable material. Cellulose nitrate, however, generally speaking, is unsuitable for the purposes of our invention due to its high degree of inflammability, instability, and the fact that it cannot be safely worked at the temperatures ordinarily employed for successfully molding the other types of cellulose derivative plastic material.

In accordance with one form of our invention, a plastic mass of cellulose acetate is prepared. The cellulose acetate may be any of the conventional varieties of this material, such as the hydrolized acetone-soluble variety, preferably in flake form. The material may, for example, be of the type described and claimed in the copending application of Fred R. Conklin, No. 625,658, filed April 10, 1933, which has now matured into U. S. Patent No. 2,048,686 of July 28, 1936, and containing less than .5% moisture.

The material is first ground in a suitable type of grinding apparatus, such as a ball mill or its equivalent, until it will pass an 80 mesh screen. This will, of course, include groups of particles, such as those having a particle size ranging from 80-200, 200-300, and so forth. It may be said, however, that the finer the material and the more uniform the particle size, the more readily can the desired plasticizing materials be incorporated therewith and the more easily can the material be worked up according to the technique herein described.

For the type of apparatus customarily employed, 100 pounds of the ground acetate, which is preferably of the type known as flake acetate, is placed in a suitable mixing machine and 30–40 pounds of an appropriate plasticizer, such as triacetin, tripropionin, dimethyl or diethyl phthalate or the like is then added and the batch mixed until a fair degree of homogeneity is obtained. The amount of plasticizer will of course vary widely with the particular type of plasticizer employed as well as with the degree of plasticity required in the finished product. In addition to triacetin and tripropionin, many different plasticizers may be used in our process so long as they form a solution with the cellulose organic derivative under heat and pressure. In some cases a mixture of plasticizers may be employed, typical examples of which are a mixture consisting of 50% dimethyl phthalate and 50% diethyl phthalate, a mixture of 50% diethyl phthalate and 50% dipropyl phthalate, or a mixture of 60% diethyl phthalate and 40% dipropyl phthalate.

The plastic mixture resulting from the above operations forms the base or body of the finished product and if it is desired to produce a colored base, a suspension or solution of an appropriate coloring material may be added to the batch and thoroughly mixed with the cellulose acetate and plasticizer during the mixing operation. The dye or other effect material may be added to the batch in a relatively concentrated condition, that is, the dye may be dissolved in the plasticizer and then added to the acetate as described, for example, in the copending application of R. O. Wood, Serial No. 582,886, Dec. 23, 1931, which has now matured into U. S. Patent No. 1,966,327 of July 10, 1934. It is particularly to be noted at this point that no solvent for the cellulose derivative is employed to attain plasticity of the mass, the mixture consisting only of cellulose derivative material, plasticizer and dissolved or suspended color or effect material.

In one embodiment of our invention little, if any, coloring or effect material is dispersed in the original base or mass of cellulose ester plastic material, while in other embodiments a sufficient amount of coloring or other material is added to give the base a different appearance than the interposed layers. In some cases the layers will have different flow characteristics than the material of the base.

After mild mixing of the cellulose acetate, plasticizer and (optionally) coloring material, say for a period of ½ to 1 hour, more or less, the material is in the form of a powder which is then transferred to steam-heated kneading rolls in the manner illustrated in Figure 1, the rolls being heated to a temperature of about 280-300 degrees F. These rolls are similar to those employed in the well known operation of milling rubber and, in fact, the operation now to be described is in many respects similar to rubber milling.

The adjustable rolls, designated by numbers 1 and 2 are placed sufficiently close together so that the plasticized cellulose acetate powder fed thereto from the hopper 3 will not pass between them. The plasticized material under the influence of heat and pressure on the rolls forms a cylinder upon roll 1, roll 2 acting merely as a platen or idle roll.

As the material builds up on roll 1, the distance between the centers of the rolls is increased in proportion to the increase in thickness of the plastic material which displays a tendency to fold up slightly in the crevice between the upper halves of the rolls as illustrated in Figure 2. In this accumulated or built up mass, each of the particles is subjected to a certain amount of swirling or churning as illustrated by the fine lines within the mass designated by the numeral 5, this swirling or churning action, making possible a thorough mixing of the ingredients and a complete colloidizing of the cellulose derivative material.

As illustrated by Figure 3, the next stage in the process consists in feeding sheets, pieces, slabs, fragments or other masses 12 of differently colored or pigmented cellulose derivative material than the mass, but of the same general composition, into the cylindrical mass of plastic material now rotating on roll 1. These sheets or pieces are caught between the rolls and carried therethrough, where, under the influence of the heat and pressure, they are spread or ironed into or over the surface of the rotating plastic material.

In order to increase what may be called the "layer" structure of the plastic mass, it is cut with a knife as illustrated in Figure 4, the cut portion 6 is stripped from the main mass of the material and, as the roll 1 rotates, is stretched as shown in Fig. 4, after which it is lapped over the mass and deposited thereon, as the roll turns, somewhat in the form of a spiral.

After the stripping and spiral redepositing of the material has occurred for some little time, this depending entirely upon the effect desired in the finished product, the material, which is then in the form of a cylinder or roll 1, is slit from end to end of the roll, removed therefrom, and placed within the platens 7 and 8 of the platen press illustrated in Figure 5, where it is subjected to a further pressing operation. After removal from the platen press, the material is cut into blocks, cubes, and other portions, such, for example, as illustrated in Figure 6. These portions are now ready for the molding operation to be described below.

It is to be particularly noted that the material consists of a series of superimposed layers of plastic material. The colored layers 9 alternating with the substantially transparent, or differently colored layers 10 of the base material.

The material is thus similar to a laminated stock, although if produced by the processes above described cannot, strictly speaking, be considered a laminated material. However, it is within the scope of our invention to prepare the material illustrated in Figure 6 by means of a true laminating operation.

As previously indicated, the base material is of a markedly different appearance from the added layers. In one embodiment of our invention the base may be transparent and the added layers colored, or vice versa, while in another embodiment the base material may be simply differently colored than the added layers. In either of these embodiments the added layers may be of such a composition that they possess different flowing characteristics than the material of the base. They may, for example, be harder than the base and therefore flow less readily or they may be softer so that they flow more readily. The following characteristics of the respective layers are controlled by varying the amount of plasticizers employed in making up the original material. For example, if it is desired that the interposed layers shall have a less degree of plasticity or flowability comparatively less plasticizer is employed in making up the material than is employed in making up the base material.

It is also particularly to be noted that the blocks or cubes are always cut from the platen-pressed material in such manner as to give a striated cross section. The cut made at any given edge need not necessarily be at right angles to the layers, although this method of cutting is preferable, but may be made at any desired angle so long as a block or portion having striated edges or cross sections is obtained.

The material of Figure 6, whether prepared by the method above described or by a laminating process, is placed in a conventional type of mold, such as that illustrated in Figure 7, supplied with suitable heating and pressure means (not shown) and subjected to a molding operation. It is to be especially noted that the molding pressure is applied to the molding mass 11 in a direction so that the line of pressure is on the edge of the block 11 and is substantially parallel to the plane of the various layers. In other words, the process may be defined as an "edge molding" operation. This edge molding produces an unexpected and novel effect in that it occasions a slight amount of fore-shortening of the respective layers with the result that small portions of the layers are spread roughly at right angles to the layers of which they form a part, but nevertheless, the parallelism of the layers is roughly or substantially preserved. This gives rise to a beautiful marble-like effect in the plastic mass, many variations of which are possible by employing different degrees of pressure, different colors or combinations of colors in the layers and in the transparent or semi-transparent base material of the blocks or portions.

Our invention is not limited to the manufacture of small articles or articles susceptible of formation only in a closed mold, since we may produce plates, panels and similar objects. In producing such products we may form a laminated or built-up structure, as previously described, of considerable thickness and then cut or skive a sheet therefrom, the cut being made substantially at right angles to the planes of the respective layers. This skived sheet is then molded, or simply platen-pressed, the molding pressure being applied in a direction substantially parallel to the original plane of the various layers. It will be readily appreciated that this manner of molding or forming the product is substantially the same as described above for the formation of smaller articles in a closed mold. We therefore include in the scope of the term "edge-molding", operations in which the forming or molding pressure is applied at the edges of the striations or layers in a direction substantially parallel to the planes of the layers, regardless of the particular shape or form which the material may take.

The particular details of our process are of course susceptible of many changes within the scope of our invention. For example, we may, as indicated, use other cellulose organic derivatives than cellulose acetate. In fact, we may use almost any of the well known cellulose organic derivatives suitably colored or not as the case requires. Although we prefer to use tripropionin as the plasticizer, we may employ other plasticizers, such as triacetin, diethyl, dipropyl, or dibutyl phthalates, or mixtures thereof.

In like manner, the time of mixing of the original ingredients, the time of the rolling, stripping, and re-rolling operations may vary within wide limits, as also may the temperatures employed as taught herein. The platen pressing operation illustrated in Figure 5 may be conveniently carried out at a temperature of 250–300 degrees F. and at a pressure of 1500 pounds per square inch, although these figures, as to both temperature and pressure, may be varied in accordance with the particular materials dealt with and the results desired.

It is readily appreciated that our invention is particularly useful for the production of an almost infinite variety of molded articles, such as knobs, handles, pen and pencil casings, desk sets, panels, plates and many other articles.

Our invention is characterized by extreme simplicity in that, once the cubes or portions of striated cross-section are obtained, all that is necessary is to subject them to the edge molding operation herein described. Unusually beautiful and variegated effects are thus produced and a high degree of control of such effects is made possible merely by controlling the application of pressure and degree of temperature applied in the molding operation or by positioning of the cubes or blocks of molding material within the mold. It is desired particularly to emphasize the fact that the layers of material within the molding mass maintain their roughly parallel relation one to another during and after the molding operation, this accounting for some of the unusually attractive effects obtainable in the molded product by means of our process.

Our invention is also particularly characterized by the fact that the product bears a striking similarity to natural products, such as marble, onyx, grained wood and the like, in that there is distributed within the mass of material a plurality of substantially parallel layers portions of which have been spread or slightly distorted within the mass to give a delicate flowing appearance to these layers. It is a distinguishing feature of our invention that due to our particular edge molding method the stiff more or less formal lines or striation of the molding blocks or blanks are broken up and softened, as it were, by a slight distortion of the colored or pigmented layers thus giving rise to the peciularly delicate appearance of the product.

Having thus described our invention, what we declare is new and desire to secure by Letters Patent of the United States is:

1. The method of forming cellulose organic acid ester molded articles of variegated appearance which are not subject to warpage, shrinkage or similar distortion defects, which comprises forming a plastic mass of cellulose organic acid ester material substantialy free from volatile solvents and containing differently colored or pigmented layers of plastic cellulose organic acid ester material disposed within the mass in approximate parallelism, cutting the mass at an angle to the said layers so as to give portions having striated cross-sections and subjecting the said portions to a molding operation under the influence of heat and pressure in which the pressure is applied at the edges of the portions and in a direction substantially parallel to the plane of the layers, whereby the said differently colored or pigmented layers are caused to slightly spread and flow within the plastic mass to give a variegated appearance, but said layers are nevertheless maintained roughly in their original approximate parallelism.

2. The method of forming cellulose organic acid ester molded articles of variegated appearance simulating marble, onyx and the like, which are not subject to warpage, shrinkage or similar distortion defects, which comprises forming a translucent plastic mass of cellulose organic acid ester material substantially free from volatile solvents and containing differently colored or pigmented layers of plastic cellulose organic acid ester material disposed within the mass in approximate parallelism, cutting the mass at an angle to the said layers so as to give portions having striated cross-sections and subjecting the said portions to a molding operation under the influence of heat and pressure in which the pressure is applied at the edges of the portions and in a direction substantially parallel to the plane of the layers, whereby the said differently colored or pigmented layers are caused to slightly spread and flow within the plastic mass to give a variegated appearance simulating marble, onyx and the like, but said layers are nevertheless maintained roughly in their original approximate parallelism.

3. The method of forming a molded plastic article of variegated appearance which comprises forming a plastic mass of cellulose derivative material substantially free from volatile solvents and containing differently colored or pigmented layers of plastic cellulose derivative material disposed therein in approximate parallelism, cutting the mass at an angle to the said layers to produce a portion having a striated cross-section, positioning said striated portion in a pressure mold having a cross-section slightly smaller than that of said portion, with the striations in a plane substantially parallel to the line of the pressing force, and forcing said portion into the mold by the aid of heat and pressure thereby causing partial spreading and flowing of each of the said differently colored or pigmented layers within the plastic mass.

WILLIAM R. MOSS.
SPENCER E. PALMER.